Jan. 18, 1949.  W. G. KOLB  2,459,659
CONVENIENCE OUTLET
Filed July 23, 1945
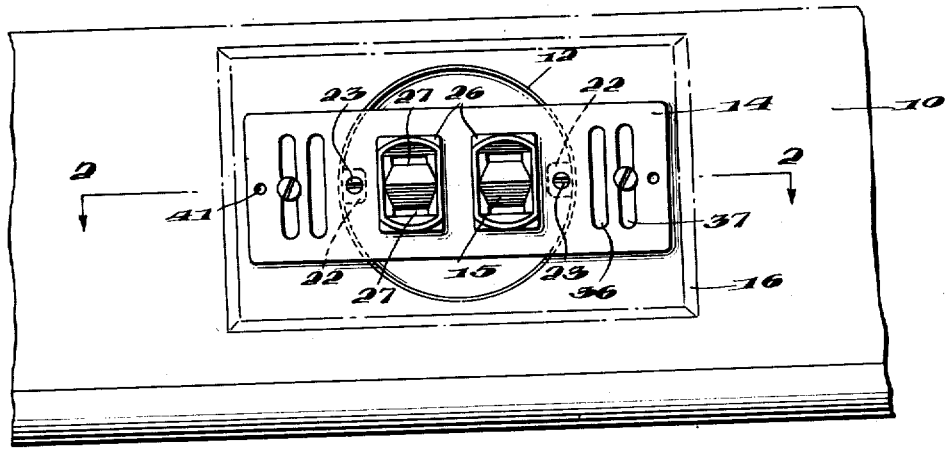
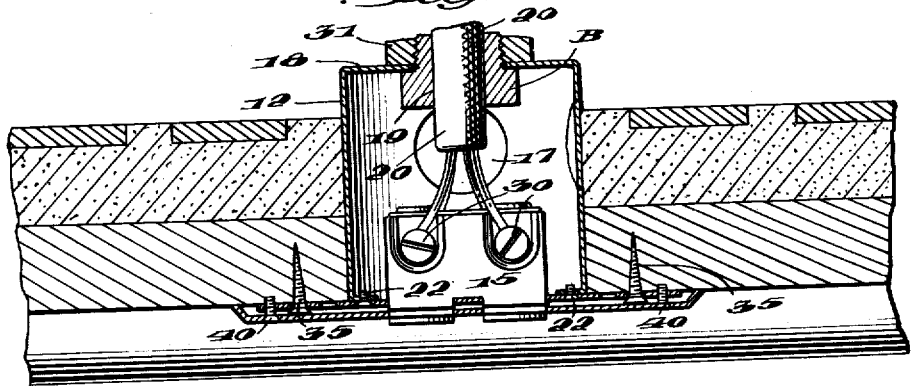
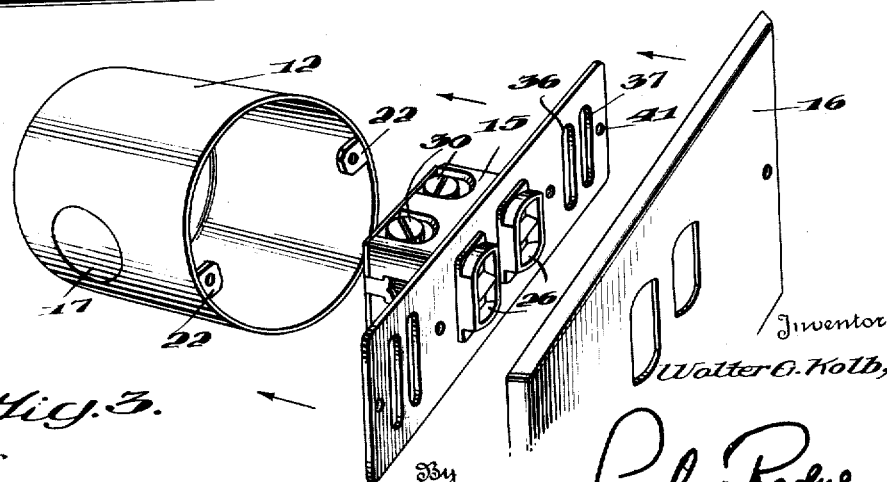
Inventor
Walter G. Kolb,
By
Leech & Radue
Attorney Patented Jan. 18, 1949

2,459,659

UNITED STATES PATENT OFFICE 2,459,659

CONVENIENCE OUTLET

Walter G. Kolb, Washington, D. C.

Application July 23, 1945, Serial No. 606,675

5 Claims. (Cl. 174—48)

This invention relates to electric wiring devices, and more particularly to an assembly of convenience outlet, wall box and wall plate.

It is a general object of the present invention to provide a novel and improved assembly of the type described particularly adapted for use in wiring already completed buildings.

More particularly it is an object of the invention to provide an assembly of the type described, including a wall box of cylindrical configuration adapted to be inserted in a circular hole, drilled into a wall or baseboard to a diameter less than the width of a standard single gang wall plate, together with a convenience outlet adapted to receive two standard attachment plugs, and equipped with a mounting strip for attachment to the wall to support the wall box, and a cover plate.

One of the important features of the invention resides in the use of a cylindrical wall box of the size defined which has no projections, flanges, lugs or the like on the exterior thereof, whereby it may be mounted in a closely fitting circular aperture drilled in a wall and positioned with its forward edge flush with the face of the wall without the necessity for providing any mortises for mounting devices or the like, the box being supported by means of extensions on the mounting strap for the convenience outlet and the whole being covered by a cover or wall plate of standard configuration adapted to match others which may have been mounted in the building at the time of construction.

Other and further objects and features of the invention will be more apparent to those skilled in the art upon a consideration of the accompanying drawing and following specification, wherein is disclosed a single exemplary embodiment of the invention, with the understanding that such changes and modifications may be made therein as fall within the scope of the appended claims without departing from the spirit of the invention.

In said drawings:

Fig. 1 is a front elevation of a wiring assembly, constructed in accordance with the present invention, shown mounted in the baseboard of a wall, the wall plate being shown in dotted lines only;

Fig. 2 is a horizontal section taken on line 2—2 of Fig. 1; and

Fig. 3 is an exploded perspective view showing the parts of the assembly.

In the wiring of old, i. e. completed, buildings the wireman has considerable difficulty in inserting wall or convenience outlets either in the baseboard or above the same, since the standardized wall box is rectangular to adapt it to receive the conventional convenience outlet wiring devices. In order to mount such boxes in a wall it is necessary to carefully draw the box outline thereon, drill four small holes at the corners and use a compass saw to remove the block of wood or plaster. Mounting ears for securing the box to the wall and which project beyond its periphery must then be mortised into the wall and attached by means of screws or the like, which usually pass so close to the side of the opening in which the box is mounted that often times difficulty is found in obtaining a grip for them. Beyond the mounting of the box the procedure of attaching the convenience outlet and wiring the same and then applying the cover plate is more or less standard as in new work.

In accordance with the present invention it is proposed to provide a wall box of cylindrical form with no external mounting lugs, ears, flanges or the like, and to introduce the same into a closely fitting circular hole simply formed by a single drilling or boring operation. Suitable bits for the purpose are available for plaster, wood, or even concrete. The box is supported in the wall with its forward edge flush with the face of the same by means of extensions on the mounting strip which positions the double convenience outlet fitting in the box. These extensions are provided with openings for passing the shanks of screws which enter the wall for mounting the whole assembly. Because the diameter of the box is less than the length of the old style rectangular one these screws are sufficiently remote from the box wall so as to obtain a good grip on the solid material of the wall to insure rigid mounting. The convenience outlet provides for the reception of two standard sized attachment plugs of the conventional parallel bladed type, and the whole assembly is covered by a standard single gang sized wall plate apertured to pass the faces of the plug blade receiving parts. The time consumed in completely installing a device of the present invention is considerably less than one-half of that necessary for installing the older form.

Referring now to the drawings,

Fig. 1 illustrates a baseboard 10 at the bottom of the wall of a room and mounted in a suitable opening therein is shown the cylindrical wall or junction box 12 supported by the mounting strap 14 of convenience outlet 15. The usual wall or cover plate 16 hides all but the faces of the convenience receptacle.

Fig. 2 illustrates more completely the arrangement, assembly and mounting of the combination of elements. The box 12 will be seen to have a circular wall provided with one or more knockouts 17 for the reception of cable clamps or the like as might be needed in various wiring jobs. It is also fitted with a bottom wall or closure 18 provided with a single central knockout, shown as removed to receive the conventional cable clamp 19 holding the sheath of cable 20, preferably of the BX variety.

In order that the box may be set in with its forward edge flush with the face of the wall, it is entirely free of any outside protuberances. It is, however, fitted with a pair of oppositely disposed inturned ears 22 perforated and threaded for receiving the screws 23 for attaching the mounting strap 14 of the wiring device to the box. The strap is preferably rectangular in general configuration and slightly less in length than the overall length of a standard single gang wall or cover plate 16, while the box diameter is less than the width of such a plate, whereby the whole assembly may be concealed in a decorative manner and will conform with other wiring devices already in place or being newly installed.

The actual wiring device 15 is of conventional construction except that the two exposed faces 26 each for receiving an attachment plug, are somewhat closer together than normal, but are still so spaced as to receive simultaneously two of the smaller sized, standard, parallel bladed attachment plugs, whose blades are received in the slots 27 through their faces. Thus the overall size of the insulating portion of the convenience outlet is such that it can be received freely in the interior of the wall box. Preferably the wiring device 15 is rigidly attached to or molded about the strap 14 whereby the two are securely integrated.

In wiring an old house the BX or other cable from a suitable source is installed with sufficient length to extend out through the hole drilled to receive the wall box; the end is stripped and suitably prepared, then is passed through the cable clamp and the desired opening in the box, after which the prepared end is wired to the terminals 30 of the convenience outlet. The cable is then pulled down into the box, the clamp secured to the box by setting up its lock nut 31, and then the screws 23 are inserted to securely fasten the wiring device and its strap to the box, making a complete assembly.

The box is now inserted in the wall opening, pushing the cable ahead of it, until the extensions of the strap 14 beyond the wall of the box rest on the baseboard or plaster. Suitable length wood screws, as shown at 35, are then passed through one of the slots 36 or 37 at each end of the mounting plate for attaching the whole assembly to the wall. Two slots are shown at each end of the mounting strip to permit a selection of screw positions in the event that space between laths might interfere with screw reception. The slots are elongated transversely so that adjustment may be made to insure vertical or horizontal mounting of the strap so that the wall plate will be properly positioned for good appearance. After the mounting strip is secured in position the cover plate 16 is assembled over it, and the small, plate-mounting screws 40 passed through suitable openings in the plate and received in the threaded apertures 41 near the ends of the mounting strap.

The whole operation can be performed in much less time than it takes to describe it and no difficulty is experience with split baseboards, chipped plaster or the like. Obviously the invention is not restricted to the exact type of convenience outlet illustrated, for it will be appreciated that independent unit type outlets may be attached to the mounting strap in the manner of such devices now on the market. The essential features of the invention comprise the close mounting of the two outlets so they will fit within a circular box of less diameter than the width of a single gang wall plate and in the unusual mounting means for the box and assembly.

Wherever throughout the specification and claims the expression "standard single gang sized wall plate" is referred to, this reference is to the types of wall plates currently in use in the wiring of residences and the like, such plates having an industrial standard size of two and three-fourths inches by four and five-eighths inches. Likewise the expression "standard attachment plug" or the like refers to the parallel bladed plug in which the spacing of the blades is substantially one-half inch.

I claim:

1. A wall outlet assembly of the type described comprising in combination, an outlet box of circular form and of less diameter than the width of a standard, single gang, wall plate, a double convenience outlet sized to fit in said box and constructed and arranged to receive two standard, parallel bladed attachment plugs, a mounting strap secured to said outlet, means entirely within the circular area of the box attaching said strap thereto, said strap extending diametrically beyond the box walls and having slots adapted to pass the shanks of mounting screws for attaching the assembly to a wall with the box recessed therein, and a standard wall plate secured to said strap and enclosing the assembly and arranged to expose the plug blade receiving openings of the outlet.

2. A wall box and convenience outlet assembly for easy mounting in a finished wall comprising in combination, a wall box of cylindrical formation adapted to be wholly received in a close fitting circular hole in the wall with its forward edge flush with the wall face, a convenience outlet adapted to fit in said box, a mounting strap rigidly attached to the outlet and having a length substantially greater than the box diameter, means within the box periphery attaching the strap to the box with the outlet therein, the ends of said strap being provided with transverse slots to receive the shanks of screws entering the wall to attach the assembly thereto and a wall plate of standard single gang size secured to said strap and completely covering the box and strap.

3. An outlet box and wiring device assembly comprising a cylindrical box having a closed bottom and smooth, unobstructed external walls for reception in a close fitting drilled opening in a wall, a wiring device having a mounting strap thereon, means within the diameter of the box attaching said strap across the open face of the box with the device wholly in the box and the strap ends extending radially beyond the walls thereof, and means in the extended ends of said strap to receive fastening means for attaching the assembly to a wall.

4. In a device for wiring old buildings, in combination, a wall box having a smooth cylindrical exterior for flush mounting in a wall or baseboard, a convenience outlet sized to fit into said box and constructed and arranged to receive two standard, parallel bladed attachment plugs, a substantially flat mounting strap secured to said outlet and extending across the open mouth of said box and beyond the walls thereof, fastening means securing said strap to the wall box within the area of the mouth thereof, the portion of the strap beyond the box being perforated to pass mounting screws for attaching the assembly to a wall, a standard, single-gang sized wall plate for said assembly completely covering the box mouth and the mounting strap and a screw attaching the plate to the assembly.

5. A wall box and convenience outlet assembly for easy mounting in a finished wall comprising in combination, a wall box of cylindrical formation adapted to be wholly received in a close fitting circular hole in the wall with its forward edge flush with the wall face, a convenience outlet constructed and arranged to receive two standard parallel-bladed attachment plugs and to fit in said box, a mounting strap rigidly attached to the outlet and having arms extending from the face of the outlet beyond the wall of the box, means within the box periphery attaching the strap to the box with the outlet therein, the arms of said strap being provided with transverse slots to receive the shanks of screws entering the wall to attach the assembly thereto and a wall plate of standard single-gang size secured to said strap and completely covering the box and strap.

WALTER G. KOLB.

REFERENCES CITED

The following references are of record in the file of this patent:

UNITED STATES PATENTS

| Number | Name | Date |
|---|---|---|
| 907,911 | Stewart | Dec. 29, 1908 |
| 1,481,771 | Workman | Jan. 22, 1924 |
| 1,604,237 | Piatt | Oct. 26, 1928 |
| 1,909,270 | Guett | May 16, 1933 |
| 1,932,018 | Hubbell | Oct. 24, 1933 |
| 1,971,302 | Hubbell | Aug. 21, 1934 |

FOREIGN PATENTS

| Number | Country | Date |
|---|---|---|
| 699,986 | Germany | Dec. 11, 1940 |